United States Patent [19]

Tsujimoto et al.

[11] Patent Number: 5,905,125

[45] Date of Patent: May 18, 1999

[54] PROCESS FOR PRODUCING POLYBUTADIENE

[75] Inventors: Nobuhiro Tsujimoto; Takefumi Yano; Kazuhiro Akikawa; Chikara Kotani; Kei Tsukahara, all of Ichihara, Japan

[73] Assignee: UBE Industries, Ltd., Ube, Japan

[21] Appl. No.: 08/882,141

[22] Filed: Jun. 25, 1997

[30] Foreign Application Priority Data

| Jun. 28, 1996 | [JP] | Japan | 8-169546 |
| Jul. 19, 1996 | [JP] | Japan | 8-190279 |
| Feb. 25, 1997 | [JP] | Japan | 9-040651 |
| Apr. 4, 1997 | [JP] | Japan | 9-086350 |

[51] Int. Cl.$^6$ ............... C08F 4/80; C08F 136/00
[52] U.S. Cl. ............... 526/144; 526/92; 526/93; 526/138; 526/153; 526/340.4
[58] Field of Search ............... 526/92, 93, 144, 526/153, 340.4, 138

[56] References Cited

U.S. PATENT DOCUMENTS

| 3,328,376 | 6/1967 | Bernemann et al. | 526/340.4 |
| 4,182,814 | 1/1980 | Bernemann et al. | |
| 4,224,426 | 9/1980 | Odar . | |
| 4,255,543 | 3/1981 | Makino et al. | 526/93 X |
| 4,503,202 | 3/1985 | Ueno et al. | 526/136 X |
| 5,109,082 | 4/1992 | Matsuda et al. | 526/93 |
| 5,397,851 | 3/1995 | Knauf et al. . | |

FOREIGN PATENT DOCUMENTS

| 795860 | 10/1968 | Canada . |
| 0 106 596 | 4/1984 | European Pat. Off. . |
| 0 511 015 | 10/1992 | European Pat. Off. . |
| 38-1243 | 2/1963 | Japan . |
| 38-2140 | 3/1963 | Japan . |
| 43-21750 | 9/1968 | Japan . |
| 59-64609 | 4/1984 | Japan . |
| 8-59725 | 3/1996 | Japan . |
| 2 029 427 | 3/1980 | United Kingdom . |

OTHER PUBLICATIONS

Ricci, et al. "Polymerization of Conjugated Dialkenes with Transition Metal Catalysts; Influence of Methylaluminoxane on Catalyst Activity and Stereospecificity," *Polymer Communications*, vol. 32, No. 17 (1991), pp. 514–517.

*Primary Examiner*—Fred Teskin
*Attorney, Agent, or Firm*—Finnegan, Henderson, Farabow, Garrett & Dunner, L.L.P.

[57] ABSTRACT

A high cis-1,4-polybutadiene is produced, with reduced gel formation, by preparing a catalyst from (A) a cobalt compound, (B) a trialkyl ($C_{1-10}$) aluminum compound, (C) a halide compound selected from those of formulae (1) and (2): (1) $AlR^2_m X_{3-m}$, and (2) $R^3$—X, wherein $R^2 = C_{1-10}$ hydrocarbon, X=halogen, m=0 to 2, $R^3 = C_{1-40}$ hydrocarbon, and (D) water in an amount of 0.77 to 1.45 moles per mole of total Al in components (B) and (C); and polymerizing 1,3-butadiene in the presence of the resultant catalyst in a polymerization medium including an alkane, cycloalkane and/or olefin hydrocarbon.

19 Claims, No Drawings

PROCESS FOR PRODUCING POLYBUTADIENE

BACKGROUND OF THE INVENTION

1. Field of the Invention

The present invention relates to a process for producing a polybutadiene having a high cis-1,4-structure content with reduced gel formation, by catalytically polymerizing 1,3-butadiene.

2. Description of the Related Art

It is well known that various types of catalysts have been provided for the polymerization of 1,3-butadiene. Particularly, since a high cis-1,4-polybutadiene, namely a polybutadiene having a high content of a cis-1,4-structure, has excellent thermal and mechanical properties, a variety of polymerization catalysts for the production of high cis-1,4-polybutadiene have been developed.

For example, Canadian Patent No. 795,860 discloses a process for producing a high cis-1,4-polybutadiene by polymerizing 1,3-butadiene in the presence of a catalyst prepared by fully mixing a hydrocarbylaluminum compound with water, aging the mixture, and mixing the aging product with cobalt dioctoate, in a medium containing at least 20% of benzene.

Japanese Examined Patent Publication No. 38-1243 discloses a process for the production of a high cis-1,4-polybutadiene by polymerizing 1,3-butadiene in the presence of a catalyst comprising a cobalt compound, an acid metal halide, an alkylaluminum compound and water.

U.S. Pat. No. 4,182,814 for P. Bernemann et al. discloses a process for polymerizing 1,3-butadiene in the presence of a catalyst including diethylaluminum chloride, water and cobalt octoate in a polymerization medium consisting of a straight chain or branched chain aliphatic hydrocarbon.

U.S. Pat. No. 4,224,426 for J. Odor discloses a process for producing a high cis-1,4-polybutadiene by polymerizing 1,3-butadiene in the presence of a catalyst comprising a cobalt compound, at least one organic aluminum compound and water. In this process, a polymerization medium comprising a $C_5$ to $C_8$ cycloalkane is mixed with an alkyl-substituted benzene in an amount of 0.1 to 2% based on the weight of the cycloalkane. This type of polymerization medium is contributory to causing the process control of the polymerization to be easy and the resultant polymerization product to be a substantially linear high cis-1,4-polybutadiene and to contain substantially no gel.

U.S. Pat. No. 5,397,851 for T. Knauf et al. discloses a process for polymerizing 1,3-butadiene in the presence of a catalyst consisting of divalent cobalt salt, alkylaluminum chloride and two different types of trialkylaluminums in a polymerization medium consisting of a mixture of an organic solvent free from aromatic compounds with water.

Polym. Commun., Vol. 32, 514 [1991] discloses a process for polymerizing 1,3-butadiene in the presence of a catalyst comprising cobalt acetylacetonate and methyl alumoxane.

However, the above-mentioned conventional catalysts for the polymerization of 1,3-butadiene are disadvantageous in that in the case where the polymerization medium contains no aromatic solvent, the resultant polymer contains a fraction having double bonds and thus gel formation easily occurs, or the catalysts exhibit a low catalytic activity. Accordingly, there has been a strong demand for an improved catalyst.

The high cis-1,4-polybutadiene having a low degree of branching in the polymer chain (namely a high degree of linearity of the polymer chain) is excellent in wear resistance, resistance to exothermic phenomenon and resilient elasticity. However, when the polymerization is carried out in a polymerization medium system containing no aromatic compound, the resultant high cis-1,4-polybutadiene has a higher degree of branching of polymer chain than that produced in a polymerization medium system containing an aromatic compound. Accordingly, there has been a strong demand for a process capable of producing a high cis-1,4-polybutadiene having a low degree of branching of polymer chain even in a polymerization medium system containing no aromatic compound.

SUMMARY OF THE INVENTION

An object of the present invention is to provide a process for producing a polybutadiene having a high cis-1,4-structure content and a high linearity of polymer chain, with reduced gel formation.

The above-mentioned object can be attained by the process of the present invention for producing a polybutadiene which comprises the steps of:

preparing a catalyst from: (A) a cobalt component comprising at least one cobalt compound, (B) an organic aluminum component comprising at least one trialkylaluminum compound of formula (1):

$$(R^1)_3Al \qquad (1)$$

wherein $R^1$ represents an alkyl group having 1 to 10 carbon atoms, which alkyl group may be substituted, (C) a halide component comprising at least one member selected from the group consisting of (a) aluminum halide compounds of the formula (2).

$$AlR^2_mX_{3-m} \qquad (2)$$

wherein $R^2$ represents a hydrocarbon group having 1 to 10 carbon atoms, which hydrocarbon group may be substituted, X represents a halogen atom, and m represents a positive number of 0 to 2, and (b) hydrocarbon halide compounds of formula (3):

$$R^3-X \qquad (3)$$

wherein X is as defined above and $R^3$ represents a hydrocarbon group having 1 to 40 carbon atoms, which hydrocarbon group may be substituted, and (D) water in an amount of 0.77 to 1.45 moles per mole of the total aluminum in the components (B) and (C), and polymerizing 1,3-butadiene in the presence of the resultant catalyst.

In the process of the present invention, the polymerization of 1,3-butadiene is preferably carried out in a polymerization medium comprising at least one member selected from the group consisting of saturated aliphatic hydrocarbons, cycloaliphatic hydrocarbons and ethylenically unsaturated aliphatic hydrocarbons having a boiling temperature of −50 to 150° C.

In the process of the present invention, the preparation of the catalyst may be carried out by pre-reacting the organic aluminum component (B) with the water component (D) to provide an alumoxane component (BD) comprising at least one alumoxane compound having recurring units of the formula:

wherein $R^1$ is as defined above and n represents an integer of 1 or more, and mixing the resultant alumoxane component (BD) with the cobalt component (A) and the halide component (C) in any sequence. In this case, (E) an additional organic aluminum component comprising at least one trialkyl aluminum compound of formula (4):

$$(R^4)_3Al \quad (4)$$

wherein $R^4$ represents an alkyl group having 1 to 10 carbon atoms, is optionally further added to the cobalt component (A), the alumoxane component (BD) and the halide component (C).

In the process of the present invention, the components (B) and (C) are employed in an atomic ratio (X/Al) of total halogen atoms in the halide component (C) to total aluminum atoms in the organic aluminum component (B) and the halide component (C) in the range of from 0.02 to 1.33.

In a preferable embodiment of the process of the present invention, the organic aluminum component (B) comprises at least one trialkylaluminum in which each of the alkyl groups has 1 to 10 carbon atoms; the halide component (C) consists of at least one organic aluminum halide of formula (2'):

$$AlR^2_pX_{3-p} \quad (2')$$

wherein X is as defined above, $R^2$ is as defined above, and p represents a numeral of 1 to 2; and an atomic ratio (X/Al) of the total halogen atoms in the halide component (C) to the total aluminum atoms in the organic aluminum component (B) and the halide component (C) is in the range of from 0.1 to 0.9.

DESCRIPTION OF THE PREFERRED EMBODIMENTS

The process of the present invention for producing a polybutadiene comprises steps of preparing a specific catalyst and polymerizing 1,3-butadiene in the presence of the resultant specific catalyst to provide a high cis-1,4-polybutadiene, a high linearity of polymer chain, with a reduced gel formation.

The catalyst for the process of the present invention is prepared from a cobalt component (A), an organic aluminum component (B), a halide component (C) and a water component (D).

The cobalt component (A) comprises at least one cobalt component preferably selected from cobalt halides, for example, cobalt chloride and cobalt bromide, cobalt salts of inorganic and organic acids, for example, cobalt nitrate, cobalt octylate, cobalt naphthenate, cobalt acetate and cobalt malonate, cobalt acetylacetonate compounds, for example cobalt bisacetylacetonate and cobalt trisacetylacetonate, cobalt-acetoacetic ester complexes, cobalt halidetriarylphosphine complexes, cobalt halidetrialkylphosphine complexes, cobalt halide-pyridine complexes, cobalt halide-picoline complexes and cobalt halide-alkyl alcohol complexes, for example, cobalt halide-ethyl alcohol complexes.

In the preparation of the catalyst in accordance with the process of the present invention, the cobalt component (A) is preferably present in an amount of $1\times10^{-7}$ to $1\times10^{-4}$ mole, more preferably $1\times10^{-6}$ to $1\times10^{-5}$ mole, per mole of 1,3-butadiene.

The organic aluminum component (B) for the process of the present invention comprises at least one trialkylaluminum compound of formula (1):

$$(R^1)_3Al \quad (1)$$

wherein $R^1$ represents an alkyl group having 1 to 10 carbon atoms. The alkyl group $R^1$ may have at least one substituent selected from, for example, halogen atoms, for example, chlorine and bromine atoms, and alkoxyl groups, for example, methoxy, ethoxy and butoxy groups.

The trialkylaluminum is preferably selected from triethylaluminum, trimethylaluminum, triisobutylaluminum, trihexylaluminum and trioctylaluminum.

In the preparation of the catalyst, the organic aluminum component (B) is preferably employed preferably in an amount of 10 to 5000 moles, more preferably 50 to 1000 moles per mole of the cobalt component (A).

In the preparation of the catalyst for the polymerization of 1,3-butadiene, the halide component (C) comprises at least one member selected from:

(a) aluminum halide compounds of formula (2):

$$AlR^2_mX_{3-m} \quad (2)$$

wherein $R^2$ represents a hydrocarbon group having 1 to 10 carbon atoms, which hydrocarbon group may be substituted, X represents a halogen atom, and m represents a positive number of 0 to 2, and (b) hydrocarbon halide compounds of the formula (3):

$$R^3-X \quad (3)$$

wherein X is as defined above, and $R^3$ represents a hydrocarbon group having 1 to 40 carbon atoms, preferably 1 to 20 carbon atoms, which hydrocarbon group may be substituted.

In formula (2) for the aluminum halide compounds, the hydrocarbon groups $R^2$ are preferably selected from alkyl groups having 1 to 10 carbon atoms, a phenyl group and a cycloalkyl groups having 3 to 10 carbon atoms. The hydrocarbon group $R^2$ may have at least one substituent selected from, for example, halogen atoms, for example, chlorine and bromine atoms and alkoxy groups, for example, methoxy, ethoxy, and butoxy groups.

The aluminum halide compound of formula (2) is preferably selected from dialkylaluminum monohalides, for example, dialkylaluminum monochlorides and dialkylaluminum monobromides; alkylaluminum sesquihalides, for example, alkylaluminum sesquichlorides, and alkylaluminum sesquibromides; alkylaluminum dihalides, for example, alkylaluminum dichlorides and alkylaluminum dibromide; diarylaluminum monohalides; arylaluminum sesqui- and di-halides; dicycloalkylaluminum monohalides; cycloalkylaluminum sesqui- and di-halides; and aluminum trihalides, for example, aluminum trichloride and aluminum tribromide.

Particularly, the aluminum halide compound of formula (2) is selected from, for example, diethylaluminum monochloride, diethylaluminum monobromide, dibutylaluminum monochloride, ethylaluminum sesquichloride, ethylaluminum dichloride, dicyclohexylaluminum monochloride and diphenylaluminum monochloride.

In formula (3) for the halide component (C), the hydrocarbon groups represented by $R^3$ include alkyl groups, for example, methyl, ethyl, isopropyl, isobutyl, and t-butyl groups, aryl groups, for example, phenyl, benzyl, benzoyl and benzylidene groups, and cycloalkyl groups, for example, cyclopentyl and cyclohexyl groups.

The hydrocarbon groups represented by $R^3$ in the formula (3), may be of the formula (5) or (6)

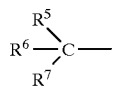

(5)

or

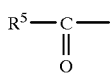

(6)

wherein $R^5$ represents a member selected from a hydrogen atom, aliphatic and aromatic hydrocarbon groups, halogen-substituted aliphatic and aromatic groups, and alkoxyl groups, $R^6$ represents a member selected from a hydrogen atom, aliphatic and aromatic hydrocarbon groups and halogen atoms, for example, chlorine and bromine atoms; and $R^7$ represents a member selected from aliphatic and aromatic hydrocarbon groups, and halogen atoms, for example, chlorine and bromine atoms, and when both $R^5$ and $R^6$ are hydrogen atoms, $R^7$ is preferably an aryl group. The aliphatic hydrocarbon groups represented by $R^5$, $R^6$ and/or $R^7$ include straight and branched chain and cyclic saturated and unsaturated hydrocarbon groups. The aromatic hydrocarbon groups represented by $R^5$, $R^6$ and $R^7$ include phenyl and substituted phenyl groups.

The hydrocarbon halide compounds of formula (3) include, for example, methyl, ethyl, iso-propyl, iso-butyl, iso-butyl, tert-butyl, phenyl, benzyl, benzoyl and benzylidene halides, for example, chlorides and bromides, methyl chloroformate, methyl bromoformate, chlorodiphenylmethane and chlorotriphenylmethane.

In the preparation of the catalyst, the halide component (C) is preferably employed in such an amount that an atomic ratio (X/Al) of total halogen atoms in the halide component (C) to total aluminum atoms in the organic aluminum component (B) and the halide component (C) is in the range of from 0.02 to 1.33, more preferably 0.1 to 0.9.

In the case where the halide component (C) consists of at least one aluminum halide compound of formula (2) alone, the atomic ratio (X/Al) of the total halogen atoms in the halide component (C) to the total aluminum atoms in the organic aluminum component (B) and the halide component (C) is preferably in the range of from 0.1 to 0.9, more preferably 0.25 to 0.75.

In the preparation of the catalyst, the component (D) comprises water. The component (D) may contain, in addition to water, a small amount, for example, 20% by weight or less, of an aliphatic diol compound, for example, ethyleneglycol, and absorbed water in inorganic substances. The water component (D) serves as a condensation agent for the components (B) and (C).

The water component (D) is employed in an amount of 0.77 to 1.45 moles, preferably 0.83 to 1.25 moles, more preferably 0.9 to 1.1 moles, per mole of the aluminum contained in the components (B) and (C).

In the preparation of the catalyst, the components (A), (B), (C) and (D) may be mixed in any sequence.

In an embodiment of the catalyst preparation procedure, the organic aluminum component (B) is mixed with the halide component (C), the resultant mixture (B+C) is admixed with the water component (D) to provide an aluminum condensation product admixture (B+C+D), and then the resultant admixture (B+C+D) is mixed with the cobalt component (A).

The catalyst preparation procedure is preferably carried out at a temperature of $-50$ to 80° C., more preferably $-20$ to 50° C.

In another embodiment of the catalyst preparation procedure, the halide component (C) is added to organic aluminum component (B); the resultant mixture is aged at a temperature of $-50°$ C. to 80° C., preferably $-20$ to 50° C., for 0.1 to 24 hours; the resultant aging product is mixed with the cobalt component (A) and the water component (D) in any sequence, preferably first with the water component (D) and finally with the cobalt component (A).

In still another embodiment of the catalyst preparation procedure, the organic aluminum component (B) comprises at least one trialkylaluminum in which each of the alkyl groups has 1 to 10 carbon atoms; the halide component (C) consists of at least one organic aluminum halide of the formula (2'):

$$AlR^2_p X_{3-p} \qquad (2')$$

wherein X is as defined above, $R^2$ is as defined above, and p represents a numeral of 1 to 2; and an atomic ratio (X/Al) of the total halogen atoms in the halide component (C) to the total aluminum atoms in the organic aluminum component (B) and the halide component (C) is in the range of from 0.1 to 0.9.

In this embodiment, the organic aluminum halide of formula (2') is preferably selected from dialkylaluminum monohalides, alkylaluminum sesquihalides, alkylaluminum dichloride, diarylaluminum monohalide, arylaluminum sesquihalides, arylaluminum dihalides, dicycloalkylaluminum monohalides, cycloalkylaluminum sesquihalides, cycloalkylaluminum dihalides. In these compounds, the alkyl, aryl and cycloalkyl groups have a carbon number within the range of from 1 to 10. Particularly the aluminum compound of the formula (2') is preferably selected from diethylaluminum monochloride, diethylaluminum monobromide, dibutylaluminum monochloride, ethylaluminum sesquichloride, ethylaluminum dichloride, dicyclohexylaluminum monochloride and diphenylaluminum monochloride.

In a further embodiment of the catalyst-preparation procedure of the process of the present invention, the organic aluminum component (B) is pre-reacted with the water component (D) to provide an alumoxane component (BD) comprising at least one alumoxane compound having recurring units of the formula:

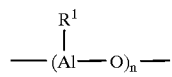

wherein $R^1$ is as defined above, and n represents an integer of 1 or more, preferably 2 to 40, more preferably 4 to 20, and the resultant alumoxane component (BD) is mixed with the cobalt component (A) and the halide component (C) in any sequence, preferably, first with the halide component (C) and then with the cobalt component (A).

The alumoxane compound may have a straight chain structure or a cyclic structure.

In the preparation of the alumoxane component (BD), the organic aluminum component (B) preferably comprises at least one member selected from trimethylaluminum, triethylaluminum, and tri-isobutylaluminum.

In this embodiment, the halide component (C) preferably consists of at least one aluminum halide compound of formula (2). Also, preferably, the atomic ratio (X/Al) of the total halogen atoms in the halide component (C) to the total aluminum atoms in the organic aluminum component (B) and the halide component (C) is in the range of from 0.1 to 2.0, more preferably from 0.5 to 1.33.

Preferably, the alumoxane component (BD) is present in an amount of 10 to 5000 moles, more preferably 50 to 1000 moles, per mole of the cobalt component (A).

The alumoxane component (BD) is optionally mixed with the halide component (C), the mixture is aged at a temperature of −50° C. to 80° C., more preferably −20 to 50° C., for 0.1 to 10 hours, and then the resultant aging product is mixed with the cobalt component (A).

In still further embodiment of the catalyst preparation procedure, the halide component (C) consists of at least one hydrocarbon halide compound of the formula (3), the alumoxane component (BD) is mixed with the halide component (C) and the component (A) in any sequence, preferably first with the halide component (C) and finally with the cobalt component (A). In this case, the atomic ratio (X/Al) of total halogen atoms in the halide component (C) to the total aluminum atoms in the alumoxane component (BD) and the halide component (C) is preferably in the range of from 0.02 to 1.33, more preferably from 0.1 to 0.80.

In this embodiment, optionally (E) an additional organic aluminum component comprising at least one trialkyl aluminum compound of the formula (4):

$(R^4)_3Al$        (4)

wherein $R^4$ represents an alkyl group having 1 to 10 carbon atoms, is further added to the cobalt component (A), the alumoxane component (BD) and the halide component (C).

The trialkylaluminum for the additional organic aluminum component (E) is preferably selected from triethylaluminum, trimethylaluminum, triisobutylaluminum, trihexylaluminum and trioctylaluminum.

When the additional organic aluminum component (E) is employed, the catalyst is preferably prepared in such a manner that the alumoxane component (BD) and the halide component (C) are aged together with the additional organic aluminum component (E) at a temperature of −50° C. to 80° C. for 0.1 to 10 hours, and then the resultant aging product is mixed with the cobalt component (A).

Also, the halide component (C) is preferably employed in such an amount that the atomic ratio (X/Al) of total halogen atoms in the halide component (C) to the total aluminum atoms in the alumoxane component (BD), the halide component (C) and the additional organic aluminum component (E) is in the range of from 0.02 to 2.0, more preferably 0.1 to 1.33.

Optionally, the alumoxane component (BD) is mixed with the halide component (C) and the additional organic aluminum component (E), the mixture is aged at a temperature of −50 to 80° C., more preferably −20 to 50° C., for 0.1 to 10 hours, and then the resultant aging product is mixed with the cobalt component (A).

In the process of the present invention, 1,3-butadiene is polymerized in the presence of the above-mentioned specific catalyst to produce a high cis-1,4-butadiene with reduced gel formation.

There is no limitation to the type of the polymerization procedure. Namely, the polymerization of 1,3-butadiene in accordance with the process of the present invention can be carried out by a bulk polymerization method or a solution polymerization method. In the solution polymerization method, 1,3-butadiene is catalytically polymerized in a polymerization medium (solvent). The polymerization medium preferably comprises at least one selected from saturated aliphatic hydrocarbons (alkanes), cycloaliphatic hydrocarbons (cycloalkanes) and ethylenically unsaturated aliphatic hydrocarbons (olefins) and aliphatic dienes, which preferably have a boiling temperature of −50° C. or more, more preferably −10 to 150° C.

The saturated aliphatic hydrocarbons (alkanes) include n-hexane, n-butane, n-heptane and n-pentane. The cycloaliphatic hydrocarbons include cyclopentane, and cyclohexane. The ethylenically unsaturated aliphatic hydrocarbons include 1-butene, cis-2-butene, trans-2-butene. 1,3-butadiene per se can be utilized as a polymerization medium.

The polymerization medium may comprise aromatic hydrocarbons, for example, toluene, benzene and xylene, mixed hydrocarbon solvents, for example, mineral spirit solvent naphtha and kerosine, and halogenated hydrocarbons, for example, methylene chloride.

Among them, cyclohexane and mixtures of cis-2-butene with trans-2-butene are useful as a polymerization medium for the process of the present invention.

In the polymerization procedure, the polymerization system comprising 1,3-butadiene, the catalyst and optionally a polymerization medium, optionally further include a molecular weight modifier which may be selected from conventional molecular weight modifiers and may contain at least one selected from non-conjugated dienes, for example, cyclooctadiene and allene, ethylene and α-olefins, for example, propylene and butene-1. Usually, the molecular weight modifier is used in an amount of 0.05 to 2.0% by weight based on the weight of 1,3-butadiene.

The polymerization procedure in the process of the present invention is preferably carried out at a temperature of −30 to 100° C., more preferably 30 to 80° C., for a time of 10 minutes to 12 hours, more preferably 30 minutes to 6 hours. The polymerization pressure is preferably under the ambient atmospheric pressure or more, more preferably from the ambient atmospheric pressure to 1013.25 kPa(G) (10 atmospheres (G)).

After the polymerization procedure for a necessary time is completed, the pressure of the inside of the reactor is reduced to the ambient atmospheric pressure, if necessary, and then the resultant product is washed and dried.

In accordance with the process of the present invention, a polybutadiene having (1) a content of cis-1,4-structure of 95% or more, (2) a ratio (Tcp/$ML_{1+4}$) of a toluene solution viscosity (Tcp) of a solution of 2.28g of the polymer in 50 ml of toluene determined at 25° C. to a Mooney viscosity ($ML_{1+4}$) determined at 100° C. in accordance Japanese Industrial Standard (JIS) K 6300, of 2 or more, and (3) a content of gel of 0.1% by weight or less, can be obtained.

The viscosity ratio (Tcp/$ML_{1+4}$) is an indicator of the degree of branching of the high cis-1,4-polybutadiene molecular chains. The viscosity Tcp is an indicator of the degree of entanglement of the polymer molecular chains in a concentrated solution of the polymer, and thus can serve as an indicator of the degree of branching of the polymer molecular chains. Provided that two high cis-1,4-polybutadienes have similar molecular weight distributions to each other, and the same molecular weight as each other, namely, the same $ML_{1+4}$ values as each other, the higher the Tcp value, the lower the degree of branching of the polymer molecular chains. The ratio Tcp/$ML_{1+4}$ is utilized as an indicator when the degrees of branching of two high cis-1,4-polybutadienes which are different in the $ML_{1+4}$ value from each other, are compared with each other. The higher the ratio Tcp/$ML_{1+4}$, the lower the degree of branching.

EXAMPLES

The present invention will be further illustrated by the following examples.

In the Examples, the following measurements were carried out for the resultant polymers.

(1) Microstructure

Microstructure of the polymer was measured by infrared absorption spectrophotometry and calculated from adsorption intensity ratios at cis 740 cm$^{-1}$, trans 967 cm$^{-1}$ and 1,2-910 cm$^{-1}$.

(2) Molecular weight distribution

Molecular weight distribution of the polymer was evaluated by a ratio Mw/Mn of a weight average molecular weight Mw to a number average molecular weight Mn of the polymer determined from a result of GPC (gas permeation chromatography) measurement in which a polystyrene was used as a standard substance.

(3) Mooney viscosity (ML$_{1+4}$)

Mooney viscosity of the polymer was determined in accordance with JIS K 6300.

(4) Toluene solution viscosity (Tcp)

Toluene solution viscosity (Tcp) of the polymer was determined by dissolving 2.28 g of the polymer in 50 ml of toluene, and subjecting the toluene solution of the polymer to a viscosity measurement by a Canon Fenske viscometer No. 400 using a viscometer-correction standard liquid in accordance with JIS Z 8809, at a temperature of 25° C.

(4) Gel content

A content of gel in the polymer was determined by dissolving about 5 g of the polymer in 200 ml of toluene, filtering the toluene solution of the polymer through a metal filter with a 250 mesh size, fully washing the metal filter with toluene, drying the metal filter at a temperature of 80° C. under vacuum for 5 hours and calculating an increase in weight of the metal filter from the dry weights of the metal filter before and after the filtration.

EXAMPLE 1

The inside space of a flask having a capacity of 50 ml was filled with a nitrogen gas, and charged with 4.5 ml of a solution of triethylaluminum (TEA) in toluene in a concentration of 1 mole/liter. Then, the solution was stirred and mixed with 1.5 ml of a solution of diethylaluminum chloride (DEAC) in cyclohexane in a concentration of 1 mole/liter. The mixture was aged at room temperature for 30 minutes.

Separately, the inside space of an autoclave having a capacity of 1.5 liters was filled with a nitrogen gas and charged with 500 ml of cyclohexane and 155g of 1,3-butadiene, and the resultant solution in the flask was stirred at 700 rpm. The temperature of the solution was adjusted to room temperature. Then the solution was mixed with 79.2 μl of water (H$_2$O) and 2.5 ml of a solution of a molecular weight modifier consisting of 1,5-cyclooctadiene (COD) in cyclohexane in a concentration of 3 moles/liter. 30 minutes after the mixing, to the resultant mixture, 4.8 ml of the above-mentioned aged liquid (having an aluminum concentration of 1000 millimoles/liter) were admixed. 5 minutes after the admixing, the temperature of the resultant admixture was adjusted to 65° C., and 1.5 ml of a solution of cobalt octanoate (Co(Oct)$_2$) in cyclohexane in a concentration of 0.004 mole/liter was added to the admixture, to provide a catalyst, and thus a polymerization of 1,3-butadiene in the present of the catalyst was started.

30 minutes after the start of the polymerization, 5.0 ml of an ethanol/heptane (1/1) solution containing an anti-aging agent was added to the polymerization system to stop the polymerization. The inside of the autoclave was opened to the ambient atmosphere, the resultant polymerization product mixture was introduced into ethyl alcohol and the resultant precipitated polybutadiene was collected. The collected polybutadiene was dried at a temperature of 50° C. under vacuum for 6 hours. The composition of the catalyst is shown in Table 1, the aging conditions of TEA and DEAC are shown in Table 2, and the polymerization results and measurement results are shown in Tables 3 and 4.

EXAMPLES 2 to 6

In each of Examples 2 to 6, a high cis-1,4-polybutadiene was prepared and tested by the same procedures as in Example 1, except that the composition of the catalyst was as shown in Table 1, the aging conditions of TEA and DEAC were as shown in Table 2, and the polymerization results and measurement results were as shown in Tables 3 and 4.

COMPARATIVE EXAMPLE 1

The inside space of an autoclave having a capacity of 1.5 liters was filled with nitrogen gas, and charged with 500 ml of cyclohexane and 155 g of 1,3-butadiene, and the resultant mixture was stirred at 700 rpm. Then, the resultant solution was mixed with 27 μl of water (H$_2$O) and 2.5 ml of a solution of 1,5-cyclooctadiene (COD, molecular weight modifier) in cyclohexane in a concentration of 3 moles/liter. Thirty minutes after the mixing, 2.4 ml of a solution of diethylaluminum chloride (DEAC) in toluene in a concentration of 1 mole/liter was added to the mixture. Five minutes after the addition, the temperature of the resultant solution was adjusted to 65° C. and the solution was added with 1.5 ml of a solution of cobalt dioctanoate (Co(Oct)$_2$) in cyclohexane in a concentration of 0.004 mole/liter, to provide a catalyst and to start the catalytic polymerization of 1,3-butadiene. Thirty minutes after the start of the polymerization, 5.0 ml of an ethanol/heptane (1/1) solution containing an anti-aging agent was added to the polymerization system to stop the polymerization.

After the autoclave was opened to the ambient atmosphere, the polymerization product mixture was introduced into ethanol to allow the resultant polymer to deposit. The deposited polybutadiene was collected. The collected polybutadiene was dried at a temperature of 50° C. under vacuum for 6 hours. The composition of the catalyst is shown in Table 1, and the polymerization results and the measurement results are shown in Tables 3 and 4. During the preparation of the catalyst, no aging procedure was carried out.

COMPARATIVE EXAMPLE 2

A polybutadiene was prepared and tested by the same procedures as in Comparative Example 1, except that the composition of the catalyst was as shown in Table 1, and the polymerization results and the measurement results were as shown in Tables 3 and 4.

COMPARATIVE EXAMPLES 3 and 4

In each of Comparative Examples 3 and 4, a cis-1,4-polybutadiene was prepared and tested by the same procedures as in Example 1, except that the composition of the catalyst was as shown in Table 1, the aging conditions of TEA and DEAC were as shown in Table 2, and the polymerization results and measurement results were as shown in Tables 3 and 4.

In each of Comparative Examples 3 and 4, the yield of cis-1,4-polybutadiene was less than 1/10 of the yields in Examples 1 to 6, and the content of the cis-1,4-structure was smaller than in Examples 1 to 6.

TABLE 1

| | | Composition of catalyst | | | | |
|---|---|---|---|---|---|---|
| Example No. | | $Co(Oct)_2$ (mmol) | TEA (mmol) | DEAC (mmol) | $H_2O$ (mmol) | COD (mmol) |
| Example | 1 | 0.006 | 3.6 | 1.2 | 4.4 | 7.5 |
| | 2 | 0.006 | 2.4 | 2.4 | 4.8 | 7.5 |
| | 3 | 0.006 | 2.4 | 2.4 | 4.4 | 7.5 |
| | 4 | 0.006 | 2.4 | 2.4 | 3.7 | 7.5 |
| | 5 | 0.006 | 1.2 | 3.6 | 4.4 | 7.5 |
| | 6 | 0.006 | 1.2 | 3.6 | 3.7 | 7.5 |
| Comparative Example | 1 | 0.006 | — | 2.4 | 1.5 | 7.5 |
| | 2 | 0.006 | — | 2.4 | 1.2 | 9.0 |
| | 3 | 0.006 | 2.4 | 2.4 | 3.2 | 7.5 |
| | 4 | 0.006 | 2.4 | 2.4 | 7.2 | 7.5 |

TABLE 2

| | | Aging condition | | | | | |
|---|---|---|---|---|---|---|---|
| | | Solvent | | TEA (mmol/L) | DEAC (mmol/L) | Temperature (° C.) | Time (hr) |
| Example | 1 | Toluene/cyclohexane | (3/1) | 750 | 250 | r.t. | 0.5 |
| | 2 | " | (1/1) | 500 | 500 | r.t. | 0.5 |
| | 3 | " | (1/1) | 500 | 500 | r.t. | 0.5 |
| | 4 | " | (1/1) | 500 | 500 | r.t. | 0.5 |
| | 5 | " | (1/3) | 250 | 750 | r.t. | 0.5 |
| | 6 | " | (1/3) | 250 | 750 | r.t. | 0.5 |
| Comparative Example | 1 | — | | — | — | — | — |
| | 2 | — | | — | — | — | — |
| | 3 | Toluene/cyclohexane | (1/1) | 500 | 500 | r.t. | 0.5 |
| | 4 | " | (1/1) | 500 | 500 | r.t. | 0.5 |

Note:
(*)$_1$r.t. room temperature

TABLE 3

| | | | Contents of microstructures (%) | | | Gel |
|---|---|---|---|---|---|---|
| Example No. | | Yield (g) | Cis-1,4- structure | Trans-1,4- structure | 1,2- structure | content (%) |
| Example | 1 | 39.5 | 97.3 | 0.7 | 2.0 | 0.012 |
| | 2 | 37.0 | 98.4 | 0.7 | 0.9 | 0.004 |
| | 3 | 81.0 | 98.0 | 0.7 | 1.3 | 0.001 |
| | 4 | 36.6 | 97.1 | 1.0 | 1.9 | 0.002 |
| | 5 | 67.3 | 98.5 | 0.7 | 0.8 | 0.020 |
| | 6 | 90.2 | 98.2 | 0.8 | 1.0 | 0.039 |
| Comparative Example | 1 | 80.4 | 98.1 | 1.1 | 0.8 | 0.449 |
| | 2 | 61.3 | 97.6 | 1.1 | 1.3 | 0.092 |
| | 3 | 6.3 | 95.2 | 1.0 | 3.8 | 0.153 |
| | 4 | 2.3 | 93.0 | 4.3 | 2.7 | 0.015 |

TABLE 4

| Example No. | | Mn × $10^{-4}$ | Mw × $10^{-4}$ | Mw/Mn | $ML_{1+4}$ | Tcp | Tcp/$ML_{1+4}$ |
|---|---|---|---|---|---|---|---|
| Example | 1 | 19 | 46 | 2.6 | 34.0 | 72.28 | 2.13 |
| | 2 | 26 | 58 | 2.2 | 60.8 | 292.00 | 4.80 |
| | 3 | 21 | 50 | 2.4 | 43.2 | 145.60 | 3.37 |
| | 4 | 15 | 34 | 2.2 | 20.7 | 59.02 | 2.85 |
| | 5 | 29 | 72 | 2.5 | 79.1 | 254.46 | 3.22 |
| | 6 | 23 | 59 | 2.5 | 47.4 | 120.56 | 2.54 |
| Comparative Example | 1 | 17 | 58 | 3.5 | 54.0 | 113.72 | 2.11 |
| | 2 | 19 | 46 | 2.5 | 35.5 | 67.18 | 1.89 |
| | 3 | 11 | 31 | 2.9 | — | — | — |
| | 4 | 26 | 67 | 2.6 | — | — | — |

EXAMPLE 7

The inside space of a flask having a capacity of 50 ml was filled with nitrogen gas, and charged with 10 ml of a solution of triethylaluminum (TEA) in cyclohexane in a concentration of 1 mole/liter. Then, the solution was stirred by a stirrer and mixed with 10 ml of a solution of diethylaluminum chloride (DEAC) in cyclohexane in a concentration of 1 mole/liter. The mixture was aged at room temperature for 30 minutes.

Separately, the inside space of an autoclave having a capacity of 1.5 liters was filled with a nitrogen gas and charged with 500 ml of cyclohexane and 155g of 1,3-butadiene, and the resultant solution in the flask was stirred at 700 rpm. The temperature of the solution was adjusted to room temperature. Then the solution was mixed with 48.6 μl (2.7m moles) of water ($H_2O$) and 2.5 ml of a solution of a molecular weight modifier consisting of 1,5-cyclooctadiene (COD) in cyclohexane in a concentration of 3 moles/liter. Thirty minutes after the mixing, to the resultant mixture, 2.4 ml of the above-mentioned aged liquid (having an aluminum concentration of 1000 millimoles/liter) were admixed. Five minutes after the admixing, the temperature of the resultant admixture was adjusted to 65° C., and 1.5 ml of a solution of cobalt octanoate ($Co(Oct)_2$) in cyclohexane in a concentration of 0.004 mole/liter was added to the admixture, to provide a catalyst, and thus to start of the catalytic polymerization of 1,3-butadiene.

Thirty minutes after the start of the polymerization, 5.0 ml of an ethanol/heptane (1/1) solution containing an anti-aging agent was added to the polymerization system to stop the polymerization. The inside of the autoclave was opened to the ambient atmosphere, the resultant polymerization product mixture was introduced into ethyl alcohol and the resultant precipitated polybutadiene was collected. The collected polybutadiene was dried at a temperature of 50° C. under vacuum for 6 hours. The composition of the catalyst is shown in Table 5, the aging conditions of TEA and DEAC are shown in Table 6, and the polymerization results and measurement results are shown in Tables 7 and 8.

EXAMPLE 8

A polybutadiene was prepared and tested by the same procedures as in Example 7, except that the composition of the catalyst was as shown in Table 5 and the aging conditions were as shown in Table 6. The polymerization results and test results are shown in Tables 7 and 8.

EXAMPLES 9 and 10

In each of Examples 9 and 10, a polybutadiene was prepared and tested by the same procedures as in Example 7, except that triethylaluminum (TEA) was replaced by triisobutylaluminum (TIBA), the composition of the catalyst was as shown in Table 5 and the aging conditions were as shown in Table 6. The polymerization results and test results are shown in Tables 7 and 8.

EXAMPLES 11 to 13

In each of Examples 11 to 13, a polybutadiene was prepared and tested by the same procedures as in Example 7, except that triethylaluminum (TEA) was replaced by trioctylaluminum (TOA), the composition of the catalyst was as shown in Table 5 and the aging conditions were as shown in Table 6. The polymerization results and test results are shown in Tables 7 and 8.

EXAMPLES 14 to 16

In each of Examples 14 to 16, a polybutadiene was prepared and tested by the same procedures as in Example 7, except that triethylaluminum (TEA) was replaced by triisobutylaluminum (TIBA), diethylaluminum chloride (DEAC) was replaced by diisobutylaluminum chloride (DIBAC), the composition of the catalyst was as shown in Table 5 and the aging conditions were as shown in Table 6. The polymerization results and test results are shown in Tables 7 and 8.

EXAMPLES 17 and 18

In each of Examples 17 and 18, a polybutadiene was prepared and tested by the same procedures as in Example 7, except that cyclohexane used as a polymerization medium was replaced by a mixed solvent consisting of 68.6% by weight of cis-2-butene, 17.1% by weight of trans-2-butene and 14.3% by weight of cyclohexane, the composition of the catalyst was as shown in Table 5 and the aging conditions were as shown in Table 6. The polymerization results and test results are shown in Tables 7 and 8.

TABLE 5

| | | | | Item Composition of catalyst | | | | |
|---|---|---|---|---|---|---|---|---|
| Example No. | $Co(Oct)_2$ (mmol) | $A^1{}_3Al$ | (mmol) | $AlR^2{}_mX_{3-m}$ | (mmol) | $H_2O$ (mmol) | COD (mmol) | $H_2O$/Total Al |
| 7 | 0.006 | TEA | 1.2 | DEAC | 1.2 | 2.7 | 7.5 | 1.125 |
| 8 | 0.006 | TEA | 1.2 | DEAC | 1.2 | 2.4 | 7.5 | 1 |
| 9 | 0.006 | TIBA | 1.2 | DEAC | 1.2 | 2.4 | 7.5 | 1 |
| 10 | 0.006 | TIBA | 1.2 | DEAC | 1.2 | 2.2 | 7.5 | 0.917 |
| 11 | 0.006 | TOA | 1.2 | DEAC | 1.2 | 2.4 | 7.5 | 1 |
| 12 | 0.006 | TOA | 1.2 | DEAC | 1.2 | 2.2 | 7.5 | 0.917 |
| 13 | 0.006 | TOA | 1.2 | DEAC | 1.2 | 2.0 | 7.5 | 0.833 |
| 14 | 0.006 | TIBA | 2.4 | DIBAC | 2.4 | 4.8 | 7.5 | 1 |
| 15 | 0.006 | TTBA | 2.4 | DIBAC | 2.4 | 4.8 | 9.4 | 1 |
| 16 | 0.006 | TIBA | 2.4 | DIBAC | 2.4 | 4.8 | 9.4 | 1 |
| 17 | 0.006 | TEA | 1.2 | DEAC | 1.2 | 2.5 | 6 | 1.04 |
| 18 | 0.006 | TEA | 1.2 | DEAC | 1.2 | 2.4 | 6 | 1 |

TABLE 6

| Example No. | Item Aging conditions of components (B) and (C) | | | | | |
|---|---|---|---|---|---|---|
| | Solvent | $(R^1)_3Al$ (mmol/L) | | $AlR^2{}_mX_{3-m}$ (mmol/L) | Temperature (° C.) | Time (hr) |
| 7 | Cyclohexane | TEA | 500 | DEAC 500 | r.t. | 0.5 |
| 8 | " | TEA | 500 | DEAC 500 | r.t. | 0.5 |
| 9 | " | TIBA | 500 | DEAC 500 | r.t. | 0.5 |
| 10 | " | TIBA | 500 | DEAC 500 | r.t. | 0.5 |
| 11 | " | TOA | 500 | DEAC 500 | r.t. | 0.5 |
| 12 | " | TOA | 500 | DEAC 500 | r.t. | 0.5 |
| 13 | " | TOA | 500 | DEAC 500 | r.t. | 0.5 |
| 14 | " | TIBA | 500 | DIBAC 500 | r.t. | 0.5 |
| 15 | " | TIBA | 500 | DIBAC 500 | r.t. | 0.5 |
| 16 | " | TIBA | 500 | DIBAC 500 | r.t. | 0.5 |
| 17 | " | TEA | 500 | DEAC 500 | r.t. | 0.5 |
| 18 | " | TEA | 500 | DEAC 500 | r.t. | 0.5 |

TABLE 7

| | | Item | | | |
|---|---|---|---|---|---|
| | | Contents of microstructures (%) | | | Gel |
| Example No. | Yield (g) | Cis-1,4- structure | Trans-1,4- structure | 1,2- structure | content (%) |
| 7 | 39.2 | 98.5 | 0.6 | 0.9 | 0.001 |
| 8 | 80.1 | 98.0 | 0.8 | 1.2 | 0.001 |
| 9 | 33.2 | 98.4 | 0.7 | 0.9 | — |
| 10 | 71.6 | 97.5 | 0.9 | 1.6 | 0.000 |
| 11 | 46.7 | 98.4 | 0.7 | 0.9 | 0.001 |
| 12 | 87.8 | 98.3 | 0.8 | 1.0 | 0.002 |
| 13 | 80.0 | 97.8 | 0.8 | 1.3 | 0.002 |
| 14 | 64.7 | 98.4 | 0.8 | 0.9 | 0.003 |

TABLE 7-continued

| | | Item | | |
|---|---|---|---|---|
| | | Contents of microstructures (%) | | Gel |
| Example No. | Yield (g) | Cis-1,4- structure | Trans-1,4- structure | 1,2- structure | content (%) |
| 15 | 66.5 | 98.3 | 0.7 | 0.9 | 0.002 |
| 16 | 88.9 | 98.3 | 0.7 | 1.0 | 0.006 |
| 17 | 57.0 | 98.2 | 0.8 | 1.0 | 0.002 |
| 18 | 75.4 | 97.9 | 0.7 | 1.1 | 0.004 |

TABLE 8

| | | | Item | | | |
|---|---|---|---|---|---|---|
| Example No. | Mn × $10^{-4}$ | Mw × $10^{-4}$ | Mw/Mn | $ML_{1+4}$ | Tcp | Tcp/$ML_{1+4}$ |
| 7 | 28 | 64 | 2.3 | 63.8 | 260.6 | 4.08 |
| 8 | 21 | 54 | 2.5 | 46.6 | 132.5 | 2.84 |
| 9 | 24 | 61 | 2.5 | 65.8 | 278.5 | 4.23 |
| 10 | 22 | 51 | 2.3 | 48.2 | 117.3 | 2.43 |
| 11 | 27 | 61 | 2.3 | 60.8 | 260.4 | 4.28 |
| 12 | 25 | 55 | 2.3 | 47.8 | 166.6 | 3.48 |
| 13 | 22 | 49 | 2.2 | 39.9 | 109.8 | 2.75 |
| 14 | 27 | 60 | 2.2 | 60.5 | 227.7 | 3.76 |
| 15 | 21 | 50 | 2.4 | 37.8 | 117.9 | 3.12 |
| 16 | 18 | 54 | 3.0 | 42.1 | 120.4 | 2.86 |
| 17 | 24 | 55 | 2.3 | 46.9 | 143.0 | 3.05 |
| 18 | 18 | 53 | 2.9 | 47.4 | 113.1 | 2.39 |

EXAMPLE 19

The inside space of a flask having a capacity of 50 ml was filled with nitrogen gas, and charged with 6 ml of a solution of triethylaluminum (TEA) in toluene in a concentration of 1 mole/liter. Then, the solution was stirred and mixed with 1.5 ml of a solution of tert-butyl chloride (t-BuCl) in cyclohexane in a concentration of 1 mole/liter. The mixture was aged at room temperature for 30 minutes.

Separately, the inside space of an autoclave having a capacity of 1.5 liters was filled with a nitrogen gas and charged with 500 ml of cyclohexane and 155 g of 1,3-butadiene, and the resultant solution in the flask was stirred at 700 rpm. The temperature of the solution was adjusted to room temperature. Then the solution was mixed with 108 μl of water ($H_2O$) and 2.5 ml of a solution of a molecular weight modifier consisting of 1,5-cyclooctadiene (COD) in cyclohexane in a concentration of 3 moles/liter. Thirty minutes after the mixing, to the resultant mixture, 4.8 ml of the above-mentioned aged liquid (having an aluminum concentration of 1000 millimoles/liter) were admixed. Five minutes after the mixing, the temperature of the resultant solution was adjusted to 65° C., and 1.5 ml of a solution of cobalt octanoate ($Co(Oct)_2$) in cyclohexane in a concentration of 0.004 mole/liter was added to the solution, to provide a catalyst, and thus to start the catalytic polymerization of 1,3-butadiene.

Thirty minutes after the start of the polymerization, 5.0 ml of an ethanol/heptane (1/1) solution containing an anti-aging agent was added to the polymerization system to stop the polymerization. The inside of the autoclave was opened to the ambient atmosphere, the resultant polymerization product mixture was introduced into ethyl alcohol and the resultant precipitated polybutadiene was collected. The collected polybutadiene was dried at a temperature of 50° C. under vacuum for 6 hours. The composition of the catalyst is shown in Table 9, the aging conditions of TEA and DEAC are shown in Table 10, and the polymerization results and measurement results are shown in Tables 11 and 12.

EXAMPLES 20 to 25

In each of Examples 20 to 25, a high cis-1,4-polybutadiene was prepared and tested by the same procedures as in Example 19, except that the composition of the catalyst was as shown in Table 9, the aging conditions of TEA and t-BuCl were as shown in Table 10, and the polymerization results and measurement results were as shown in Tables 11 and 12.

TABLE 9

| | Item | | | | |
|---|---|---|---|---|---|
| | Composition of catalyst | | | | |
| Example No. | $Co(Oct)_2$ (mmol) | TEA (mmol) | t-BuCl (mmol) | $H_2O$ (mmol) | COD (mmol) |
| 19 | 0.006 | 4.8 | 1.2 | 6.0 | 7.5 |
| 20 | 0.006 | 4.8 | 1.2 | 5.3 | 7.5 |
| 21 | 0.006 | 4.8 | 1.2 | 4.8 | 7.5 |
| 22 | 0.006 | 4.8 | 2.4 | 5.3 | 7.5 |
| 23 | 0.006 | 4.8 | 2.4 | 4.8 | 7.5 |
| 24 | 0.006 | 4.8 | 2.4 | 4.4 | 7.5 |
| 25 | 0.006 | 4.8 | 3.6 | 4.8 | 7.5 |

TABLE 10

| | Item | | | | |
|---|---|---|---|---|---|
| | Aging conditions for TEA and t-BuCl | | | | |
| Example No. | Solvent | TEA (mmol/L) | t-BuCl (mmol/L) | Temperature (° C.) | Time (hr) |
| 19 | Toluene and cyclohexane (4/1) | 800 | 200 | r.t. | 0.5 |
| 20 | " (4/1) | 800 | 200 | r.t. | 0.5 |
| 21 | " (4/1) | 800 | 200 | r.t. | 0.5 |
| 22 | " (4/2) | 670 | 330 | r.t. | 0.5 |
| 23 | " (4/2) | 670 | 330 | r.t. | 0.5 |
| 24 | " (4/2) | 670 | 330 | r.t. | 0.5 |
| 25 | " (4/3) | 570 | 430 | r.t. | 0.5 |

TABLE 11

| | | Item | | | |
|---|---|---|---|---|---|
| | | Content of microstructures | | | Gel |
| Example No. | Yield (g) | Cis-1,4- structure | Trans-1,4- structure | 1,2- structure | content (%) |
| 19 | 20.8 | 95.9 | 1.0 | 3.1 | 0.030 |
| 20 | 34.4 | 96.7 | 1.1 | 2.3 | 0.026 |
| 21 | 24.4 | 96.0 | 1.0 | 3.0 | 0.027 |
| 22 | 76.3 | 98.2 | 0.7 | 1.1 | 0.014 |
| 23 | 61.8 | 97.3 | 0.9 | 1.8 | 0.017 |
| 24 | 40.9 | 96.7 | 1.1 | 2.2 | 0.055 |
| 25 | 76.3 | 97.9 | 0.8 | 1.3 | 0.053 |

TABLE 12

| Example No. | Mn × $10^{-4}$ | Mw × $10^{-4}$ | Mw/Mn | $ML_{1+4}$ | Tcp | TCP/$ML_{1+4}$ |
|---|---|---|---|---|---|---|
| 19 | 16 | 41 | 2.6 | 32.9 | 108.19 | 3.29 |
| 20 | 15 | 38 | 2.4 | 30.7 | 75.40 | 2.46 |
| 21 | 13 | 36 | 2.7 | 31.5 | 70.10 | 2.23 |
| 22 | 21 | 50 | 2.4 | 41.4 | 153.63 | 3.71 |
| 23 | 18 | 40 | 2.3 | 30.6 | 80.41 | 2.63 |
| 24 | 15 | 34 | 2.3 | 21.6 | 50.73 | 2.35 |
| 25 | 19 | 46 | 2.5 | 45.1 | 124.07 | 2.75 |

EXAMPLE 26

The inside space of a flask having a capacity of 50 ml was filled with a nitrogen gas and charged with 31.7 ml of cyclohexane. Then, to the cyclohexane in the flask was added 2.00 ml of a solution of 3.46 m moles, in terms of aluminum atom, of methyl alumoxane (MAO) in toluene and 0.865 ml of a solution of 0.865 m moles of tert-butyl chloride (t-BuCl). The mixture in the flask was aged at room temperature for 30 minutes.

Separately, the inside space of an autoclave having a capacity of 1.5 liter was filled with nitrogen gas and charged with 500 ml of cyclohexane and 155 g of 1,3-butadiene. The resultant solution was mixed with a cyclohexane solution containing 9.0m moles of 1,5-cyclooctadiene (COD) as a molecular weight modifier, 24 ml of the above-mentioned aging product, and a cyclohexane solution containing 0.006m mole of cobalt octanoate $(Co(Oct)_2)$, to provide a catalyst and to start a polymerization of 1,3-butadiene in the presence of the catalyst. The polymerization was carried out at a temperature of 65° for 30 minutes. The composition of the catalyst is shown in Table 13. The aging compositions are shown in Table 14. The polymerization results and test results are shown in Tables 15 and 16.

EXAMPLES 27 and 28

In each of Examples 27 and 28, a high cis-1,4-polybutadiene was prepared and tested by the same procedures as in Example 26, except that the catalyst was prepared in the composition as shown in Table 13. Namely, the amount of t-BuCl was changed. The aging conditions are shown in Table 14, and the polymerization results and the test results are shown in Tables 15 and 16.

EXAMPLES 29 and 30

In each of Examples 29 and 30, a high cis-1,4-polybutadiene was prepared and tested by the same procedures as in Example 26, except that the catalyst was prepared in the composition as shown in Table 13. Namely, the amounts of MAO and t-BuCl were changed and triethylaluminum (TEA) was added, as an additional organic aluminum component, in the amount as shown in Table 13. The aging conditions are shown in Table 14, and the polymerization results and the test results are shown in Tables 15 and 16.

COMPARATIVE EXAMPLE 5

A polybutadiene was prepared and tested by the same procedures as in Example 26, except that in the preparation of the catalyst, no COD and no t-BuCl were employed. Accordingly, no aging procedure was carried out. The composition of the catalyst is shown in Table 13, and the polymerization results and test results are shown in Tables 15 and 16.

COMPARATIVE EXAMPLE 6

Inside space of an autoclave having a capacity of 1.5 liters was filled with a nitrogen gas and charged with 500 ml of cyclohexane and 155 g of 1,3-butadiene. The resultant solution was added with 1.2 m moles of water $(H_2O)$ and a cyclohexane solution containing, as a molecular weight modifier, 9. Om moles of 1,5-cyclooctadiene (COD), and the resultant mixture was stirred for 30 minutes. Then, the mixture was further mixed with a cyclohexane solution containing 2.4 m moles of diethylaluminum chloride (DEAC) and a cyclohexane solution containing 0.006 m mole of $Co(Oct)_2$, to provide a catalyst. The resultant mixture was subjected to a catalytic polymerization at a temperature of 65° C. for 30 minutes. The polymerization results and the test results are shown in Tables 15 and 16.

TABLE 13

| | | Composition of catalyst | | | | |
|---|---|---|---|---|---|---|
| Example No. | | $Co(Oct)_2$ (mmol) | MAO (mmol) | t-BuCl (mmol) | TEA (mmol) | COD (mmol) |
| Example | 26 | 0.006 | 2.4 | 0.6 | — | 9.0 |
| | 27 | 0.006 | 2.4 | 1.2 | — | 9.0 |
| | 28 | 0.006 | 2.4 | 1.8 | — | 9.0 |
| | 29 | 0.006 | 1.2 | 2.4 | 1.2 | 9.0 |
| | 30 | 0.006 | 1.8 | 2.4 | 0.6 | 9.0 |
| Comparative Example | 5 | 0.006 | 2.4 | — | — | — |

TABLE 14

| | | Aging conditions of MAO and t-BuCl | | |
|---|---|---|---|---|
| Example No. | | Al content of aging mixture (mmol/l) | Temperature (° C.) | Time (hr) |
| Example | 26 | 100 | r.t. | 0.5 |
| | 27 | 100 | r.t. | 0.5 |
| | 28 | 100 | r.t. | 0.5 |
| | 29 | 100 | r.t. | 0.5 |
| | 30 | 100 | r.t. | 0.5 |
| Comparative Example | 5 | — | — | — |

TABLE 15

| | | | Contents of microstructures (%) | | | |
|---|---|---|---|---|---|---|
| Example No. | | Yield (g) | Cis-1,4-structure | Trans-1,4-structure | 1,2-structure | Gel content (%) |
| Example | 26 | 49.7 | 97.7 | 0.9 | 1.3 | 0.012 |
| | 27 | 54.2 | 98.3 | 0.7 | 0.9 | 0.009 |
| | 28 | 21.1 | 98.0 | 1.1 | 0.9 | 0.017 |
| | 29 | 68.9 | 98.3 | 0.8 | 0.9 | 0.030 |
| | 30 | 65.0 | 98.5 | 0.7 | 0.8 | 0.070 |
| Comparative Example | 5 | 5.1 | 96.6 | 0.9 | 2.6 | — |
| | 6 | 61.3 | 97.6 | 1.1 | 1.3 | 0.092 |

TABLE 16

| Example No. | Mn × $10^{-4}$ | Mw × $10^{-4}$ | Mw/Mn | $ML_{1+4}$ | Tcp | Tcp/$ML_{1+4}$ |
|---|---|---|---|---|---|---|
| Example 26 | 20 | 40 | 2.0 | 27.3 | 101.38 | 3.71 |
| 27 | 18 | 43 | 2.3 | 27.8 | 103.41 | 3.72 |
| 28 | 18 | 50 | 2.7 | 42.3 | 125.90 | 2.98 |
| 29 | 17 | 41 | 2.4 | 23.0 | 69.96 | 3.04 |
| 30 | 15 | 42 | 2.8 | 23.1 | 68.87 | 2.98 |
| Comparative Example 5 | 12 | 28 | 2.3 | — | — | — |
| 6 | 19 | 46 | 2.5 | 35.5 | 67.18 | 1.89 |

EXAMPLES 31 to 33

In each of Examples 31 to 33, a high cis-1,4-polybutadiene was prepared and tested by the same procedures as in Example 26, except that tert-butyl bromide (t-BuBr) was employed in the amount as shown in Table 17, in place of the t-BuCl, and MAO and COD were employed in the amounts as shown in Table 17. Also, the aging conditions for MAO and t-BuBr are as shown in Table 18.

The polymerization results and test results are shown in Tables 19 and 20.

EXAMPLES 34 and 35

In each of Examples 34 and 35, a high cis-1,4-polybutadiene was prepared and tested by the same procedures as in Example 26 with the following exceptions.

Ethylalumoxane (EAO) was employed in the amount as shown in Table 17, in place of the MAO. The t-BuCl and COD were employed in the amounts as shown in Table 17. The aging conditions for EAO and t-BuCl were as shown in Table 18. The polymerization results and test results are shown in Tables 19 and 20.

EXAMPLES 36 to 37

In each of Examples 36 to 37, a high cis-1,4-polybutadiene was prepared and tested by the same procedures as in Example 26, except that in place of the MAO, isobutylalumoxane (IBAO) was employed in the amount as shown in Table 17, and t-BuCl and COD were employed in the amounts as shown in Table 17. Also, the aging conditions for IBAO and t-BuCl are as shown in Table 18.

The polymerization results and test results are shown in Tables 19 and 20.

TABLE 17

| | | | | | |
|---|---|---|---|---|---|
| | | | | Hydrocarbon | |
| Example No. | Co(Oct)$_2$ | Alumoxane | | chloride | | COD |
| | (mmol) | Type | (m mole) | Type | (m mole) | (mmol) |
| 31 | 0.006 | MAO | 2.5 | t-BuBr | 0.6 | 7.5 |
| 32 | 0.006 | MAO | 2.5 | t-BuBr | 1.3 | 7.5 |
| 33 | 0.006 | MAO | 2.5 | t-BuBr | 1.7 | 7.5 |
| 34 | 0.006 | EAO | 1.4 | t-BuCl | 1.2 | 7.5 |
| 35 | 0.006 | EAO | 2.7 | t-BuCl | 2.4 | 7.5 |
| 36 | 0.006 | IBAO | 2.4 | t-BuCl | 1.2 | 7.5 |
| 37 | 0.006 | IBAO | 4.8 | t-BuCl | 2.4 | 7.5 |

TABLE 18

| | Aging conditions for alumoxane and hydrocarbon chloride | | |
|---|---|---|---|
| Example No. | Al content in aging mixture (mmol/l) | Temperature (° C.) | Time (hr) |
| 31 | 200 | r.t. | 0.5 |
| 32 | 200 | r.t. | 0.5 |
| 33 | 200 | r.t. | 0.5 |
| 34 | 200 | r.t. | 0.5 |
| 35 | 200 | r.t. | 0.5 |
| 36 | 200 | r.t. | 0.5 |
| 37 | 200 | r.t. | 0.5 |

TABLE 19

| | | Contents of microstructures (%) | | | Gel |
|---|---|---|---|---|---|
| Example No. | Yield (g) | Cis-1,4-structure | Trans-1,4-structure | 1,2-structure | content (%) |
| 31 | 37.1 | 97.3 | 0.7 | 2.0 | 0.003 |
| 32 | 43.0 | 97.5 | 1.0 | 1.5 | 0.002 |
| 33 | 32.2 | 97.8 | 1.0 | 1.2 | 0.020 |
| 34 | 25.7 | 98.2 | 0.8 | 1.1 | 0.001 |
| 35 | 51.1 | 98.3 | 0.8 | 0.9 | 0.000 |
| 36 | 23.4 | 98.2 | 0.9 | 1.0 | 0.005 |
| 37 | 53.7 | 98.1 | 0.9 | 1.0 | 0.007 |

TABLE 20

| Example No. | Mn × $10^{-4}$ | Mw × $10^{-4}$ | Mw/Mn | $ML_{1+4}$ | Tcp | Tcp/$ML_{1+4}$ |
|---|---|---|---|---|---|---|
| 31 | 17 | 38 | 2.3 | 39.5 | 105.49 | 2.67 |
| 32 | 17 | 38 | 2.3 | 51.0 | 152.74 | 3.12 |
| 33 | 15 | 34 | 2.3 | 52.0 | 150.15 | 2.88 |
| 34 | 24 | 55 | 2.3 | 53.1 | 245.57 | 4.62 |
| 35 | 22 | 51 | 2.3 | 43.9 | 185.07 | 4.22 |
| 36 | 24 | 56 | 2.3 | 49.6 | 218.71 | 4.41 |
| 37 | 21 | 51 | 2.5 | 36.6 | 144.39 | 3.95 |

EXAMPLE 38

The inside space of an autoclave having a capacity of 1.5 liters was filled with nitrogen gas and charged with 500 ml of cyclohexane and 155 g of 1,3-butadiene. The resultant solution was mixed with a cyclohexane solution containing 9.0 m moles of 1,5-cyclooctadiene (COD), as a molecular weight modifier, a toluene solution containing 1.2 m moles, in terms of aluminum atom, of methyl alumoxane (MAO), a cyclohexane solution containing 1.2 m moles of ethylaluminum sesquichloride (EASC) and a cyclohexane solution containing 0.006 m mole of cobalt octanoate (Co(Oct)$_2$), to provide a polymerization system containing a catalyst. The polymerization was carried out at a temperature of 65° C. for 30 minutes.

The composition of the catalyst is shown in Table 21. The polymerization results and the test results are shown in Tables 23 and 24.

EXAMPLE 39

A high cis-1,4-polybutadiene was prepared and tested by the same procedures as in Example 38, except that the EASC was replaced by ethylaluminum dichloride (EADC). The composition of the catalyst is shown in Table 21. The polymerization results and test results are shown in Tables 23 and 24.

EXAMPLE 40

A high cis-1,4-polybutadiene was prepared and tested by the same procedures as in Example 38, except that the EASC was replaced by diethylaluminum chloride (DEAC), the MAO solution was mixed with the DEAC solution, and the mixture was aged under the conditions as shown in Table 22.

Also, the aging mixture contained aluminum in the content as shown in Table 22.

The composition of the catalyst is shown in Table 21 and the polymerization results and the test results are shown in Tables 23 and 24.

EXAMPLES 41 to 45

In each of Examples 41 to 45, a high cis-1,4-polybutadiene was prepared and tested by the same procedures as in Example 40, with the following exceptions. The mixture of the MAO solution with the EASC solution was aged at a temperature of 50° C. for 3 hours, and the aging mixture contained aluminum in the content as shown in Table 22. The aging product was mixed with 500 ml of cyclohexane and 155g of 1,3-butadiene, then with the COD solution and finally with the Co(Oct)$_2$ solution. The content of the resultant catalyst is shown in Table 21, the aging conditions are shown in Table 22, and the polymerization results and the test results are shown in Tables 23 and 24.

EXAMPLE 46

The inside space of a flask having a capacity of 50 ml was filled with a nitrogen gas and charged with 40.67 ml of cyclohexane. Then, to the cycloxane in the flask was added 4.33 ml of a toluene solution containing 7.50 m moles, in terms of aluminum atoms, of methyl alumoxane (MAO) and 3.75 m moles of aluminum trichloride (ATC) and the resultant mixture was aged at a temperature of 50° C. for 3 hours to provide an aged solution.

Separately, the inside space of an autoclave having a capacity of 1.5 liter was filled with nitrogen gas and charged with 500 ml of cyclohexane and 155 g of 1,3-butadiene. The resultant solution was mixed with a cyclohexane solution containing 9.0 m moles of 1,5-cyclooctadiene (COD) as a molecular weight modifier, 14.4 ml of the above-mentioned aged solution, and a cyclohexane solution containing 0.006 m mole of cobalt octanoate (Co(Oct)$_2$), to provide a catalyst and to start a polymerization of 1,3-butadiene in the presence of the catalyst. The polymerization was carried out at a temperature of 65° for 30 minutes. The composition of the catalyst is shown in Table 21. The aging compositions are shown in Table 22. The polymerization results and test results are shown in Tables 23 and 24.

COMPARATIVE EXAMPLE 7

A polybutadiene was prepared and tested by the same procedures as in Example 38, except that no COD and no EASC were employed. No aging procedure was carried out.

The composition of the catalyst is shown in Table 21, and the polymerization results and the test results are shown in Tables 23 and 24.

COMPARATIVE EXAMPLE 8

A polybutadiene was prepared and tested by the same procedures as in Example 38, except that no COD and no MAO were employed. No aging procedure was carried out.

The composition of the catalyst is shown in Table 21, and the polymerization results and the test results are shown in Tables 23 and 24.

COMPARATIVE EXAMPLE 9

A polybutadiene was prepared and tested by the same procedures as in Example 39, except that no COD and no MAO were employed. No aging procedure was carried out.

The composition of the catalyst is shown in Table 21, and the polymerization results and the test results are shown in Tables 23 and 24.

COMPARATIVE EXAMPLE 10

The inside space of an autoclave having a capacity of 1.5 liters was filled with a nitrogen gas and charged with 500 ml of cyclohexane and 155 g of 1,3-butadiene. The resultant solution was mixed with 1.2 m moles of water and a cyclohexane solution containing 9.0 m moles of 1,5-cyclooctadiene (COD), as a molecular weight modifier. The resultant mixture was stirred at room temperature for 30 minutes. Then the mixture was further mixed with a cyclohexane solution containing 2.4 m moles of diethylaluminum chloride (DEAC) and a cyclohexane solution containing 0.006 m mole of cobalt octanoate (Co(Oct)$_2$), to provide a polymerization system containing a catalyst. The polymerization was carried out at a temperature of 65° C. for 30 minutes. No aging procedure was carried out.

The composition of the catalyst is shown in Table 21. The polymerization results and the test results are shown in Tables 23 and 24.

TABLE 21

| | Item Composition of catalyst | | | | | |
|---|---|---|---|---|---|---|
| | Co(Oct)$_2$ | MAO | Aluminum chloride compound | | H$_2$O | COD |
| Example No. | (mmol) | (mmol) | Type | (mmol) | (mmol) | (mmol) |
| Example 38 | 0.006 | 1.2 | EASC | 1.2 | — | 9.0 |
| 39 | 0.006 | 1.2 | EADC | 1.2 | — | 9.0 |
| 40 | 0.006 | 1.2 | DEAC | 3.6 | — | 9.0 |
| 41 | 0.006 | 1.2 | EASC | 1.2 | — | 9.0 |
| 42 | 0.006 | 2.4 | EASC | 2.4 | — | 9.0 |
| 43 | 0.006 | 4.8 | EASC | 4.8 | — | 9.0 |
| 44 | 0.006 | 2.4 | EASC | 4.8 | — | 9.0 |
| 45 | 0.006 | 2.4 | EASC | 1.2 | — | 9.0 |
| 6 | 0.006 | 2.4 | ATC | 1.2 | — | 9.0 |
| Comparative Example 7 | 0.006 | 2.4 | — | — | — | — |
| 8 | 0.006 | — | EASC | 1.2 | — | — |
| 9 | 0.006 | — | EADC | 1.2 | — | — |
| 10 | 0.006 | — | DEAC | 2.4 | 1.2 | 9.0 |

TABLE 22

| | Item Aging conditions of MAO and Al-halide compound | | |
|---|---|---|---|
| Example No. | Al content in aging mixture (mmol/l) | Temperature (° C.) | Time (hr) |
| 38 | — | — | — |
| 39 | — | — | — |
| 40 | 9.6 | 65 | 0.5 |
| 41 | 48 | 50 | 3.0 |
| 42 | 96 | 50 | 3.0 |
| 43 | 192 | 50 | 3.0 |

TABLE 22-continued

Item
Aging conditions of MAO and Al-halide compound

| Example No. | Al content in aging mixture (mmol/l) | Temperature (° C.) | Time (hr) |
|---|---|---|---|
| 44 | 144 | 50 | 3.0 |
| 45 | 72 | 50 | 3.0 |
| 46 | 250 | 50 | 3.0 |

TABLE 23

Item

Contents of microstructures (%)

| Example No. | | Yield (g) | Cis-1,4-structure | Trans 1,4-structure | 1,2-structure | Gel content (%) |
|---|---|---|---|---|---|---|
| Example | 38 | 41.6 | 97.9 | 0.9 | 1.2 | 0.016 |
|  | 39 | 65.7 | 98.0 | 0.9 | 1.0 | 0.015 |
|  | 40 | 44.1 | 97.4 | 0.9 | 1.7 | 0.016 |
|  | 41 | 52.2 | 97.5 | 0.7 | 1.8 | 0.009 |
|  | 42 | 71.1 | 98.2 | 0.8 | 1.0 | 0.007 |
|  | 43 | 44.9 | 98.1 | 0.9 | 1.0 | 0.013 |
|  | 44 | 77.2 | 98.3 | 0.7 | 1.0 | 0.029 |
|  | 45 | 56.6 | 97.4 | 1.1 | 1.5 | 0.006 |
|  | 46 | 70.6 | 98.0 | 0.9 | 1.0 | 0.042 |
| Comparative Example | 7 | 5.1 | 96.6 | 0.9 | 2.6 | — |
|  | 8 | 14.5 | 76.6 | 4.7 | 18.6 | — |
|  | 9 | 14.0 | 83.5 | 7.9 | 8.6 | — |
|  | 10 | 61.3 | 97.6 | 1.1 | 1.3 | 0.092 |

TABLE 24

Item

| Example No. | | Mn × $10^{-4}$ | Mw × $10^{-4}$ | Mw/Mn | $ML_{1+4}$ | Tcp | Tcp/$ML_{1+4}$ |
|---|---|---|---|---|---|---|---|
| Example | 38 | 20 | 39 | 2.0 | 29.0 | 75.50 | 2.60 |
|  | 39 | 19 | 45 | 2.4 | 31.6 | 76.15 | 2.41 |
|  | 40 | 16 | 36 | 2.2 | 24.9 | 74.81 | 3.00 |
|  | 41 | 20 | 45 | 2.2 | 31.1 | 74.93 | 2.41 |
|  | 42 | 20 | 46 | 2.3 | 35.0 | 92.54 | 2.64 |
|  | 43 | 20 | 42 | 2.1 | 30.6 | 83.73 | 2.74 |
|  | 44 | 18 | 44 | 2.4 | 30.2 | 68.90 | 2.28 |
|  | 45 | 21 | 43 | 2.1 | 34.7 | 82.87 | 2.39 |
|  | 46 | 15 | 43 | 2.9 | 26.2 | 77.99 | 2.98 |
| Comparative Example | 7 | 12 | 28 | 2.3 | — | — | — |
|  | 8 | 0.94 | 1.8 | 2.0 | — | — | — |
|  | 9 | 2.1 | 6.8 | 3.2 | — | — | — |
|  | 10 | 19 | 46 | 2.5 | 35.5 | 67.18 | 1.89 |

In Examples 1 to 46, the resultant cis-1,4-butadiene had a high content of cis-1,4-structure and a low gel content.

What we claim is:

1. A process for producing polybutadiene having a content of cis-1,4-structure of 95% or more, comprising:
preparing a catalyst from:
(A) a cobalt component comprising at least one cobalt compound selected from cobalt halides, cobalt salts of inorganic and organic acids, cobalt acetylacetonate compounds, cobalt-acetoacetic ester complexes, cobalt halide-pyridine complexes, cobalt halide-picoline complexes, and cobalt halide-alkyl alcohol complexes,
(B) an organic aluminum component comprising at least one trialkylaluminum compound of formula (1):

$$(R^1)_3Al \qquad (1)$$

wherein $R^1$ represents an alkyl group having 1 to 10 carbon atoms, which alkyl group may be substituted,
(C) a halide component comprising at least one member selected from the group consisting of (a) aluminum halide compounds of formula (2):

$$AlR^2_mX_{3-m} \qquad (2)$$

wherein $R^2$ represents a hydrocarbon group having 1 to 10 carbon atoms, which hydrocarbon group may be substituted, X represents a halogen atom, and m represents a positive number of 0 to 2, and
(b) hydrocarbon halide compounds of formula (3):

$$R^3{-}X \qquad (3)$$

wherein X is as defined above and $R^3$ represents a hydrocarbon group having 1 to 40 carbon atoms, which hydrocarbon group may be substituted, and
(D) water in an amount of 0.77 to 1.45 moles per mole of the total aluminum in components (B) and (C), and
polymerizing 1,3-butadiene in the presence of the resultant catalyst.

2. The process as claimed in claim 1, wherein the cobalt component (A) is present in an amount of $1\times10^{-7}$ to $1\times10^{-4}$ mole per mole of 1,3-butadiene.

3. The process as claimed in claim 1, wherein the organic aluminum component (B) is present in an amount of 10 to 5000 moles per mole of the cobalt component (A).

4. The process as claimed in claim 1, wherein an atomic ratio (X/Al) of total halogen atoms in the halide component (C) to total aluminum atoms in the organic aluminum component (B) and the halide component (C) is in the range of from 0.02 to 1.33.

5. The process as claimed in claim 4, wherein the halide component (C) includes at least one aluminum halide compound of formula (2), and the atomic ratio (X/Al) of the total halogen atoms in the halide component (C) to the total aluminum atoms in the organic aluminum component (B) and the halide component (C) is in the range of from 0.1 to 0.9.

6. The process as claimed in claim 1, wherein the catalyst is prepared by mixing the components (A), (B), (C) and (D) in any sequence.

7. The process as claimed in claim 6, wherein the organic aluminum component (B) is mixed with the halide component (C), the resultant mixture (B+C) is admixed with the water component (D), and the resultant admixture (B+C+D) is mixed with the cobalt component (A).

8. The process as claimed in claim 6, wherein the organic aluminum component (B) is aged together with the halide component (C) at a temperature of −50 to 80° C. for 0.1 to 24 hours, and the resultant aged product is mixed with the cobalt component (A) and the water component (D) in any sequence.

9. The process as claimed in claim 1, wherein in the preparation of the catalyst, the organic aluminum component (B) comprises at least one trialkylaluminum in which each of the alkyl groups has 1 to 10 carbon atoms; the halide component (C) consists of at least one organic aluminum halide of formula (2'):

$$AlR^2_pX_{3-p} \qquad (2')$$

wherein X is as defined above, $R^2$ is as defined above, and p represents a numeral of 1 to 2; and an atomic ratio (X/Al)

of the total halogen atoms in the halide component (C) to the total aluminum atoms in the organic aluminum component (B) and the halide component (C) is in the range of from 0.1 to 0.9.

10. The process as claimed in claim 1, wherein in the preparation of the catalyst, the organic aluminum component (B) is pre-reacted with the water component (D) to provide an alumoxane component (BD) comprising at least one alumoxane compound having recurring units of the formula:

$$-(Al-O)_n-$$
$$\quad\ |$$
$$\quad R^1$$

wherein $R^1$ is as defined above and n represents an integer of 1 or more, and the resultant alumoxane component (BD) is mixed with the cobalt component (A) and the halide component (C) in any sequence.

11. The process as claimed in claim 10, wherein in the preparation of the catalyst, the alumoxane component (BD) is aged together with the halide component (C) at a temperature of −50° C. to 80° C. for 0.1 to 10 hours, and then the aged product is mixed with the cobalt component (A).

12. The process as claimed in claim 10, wherein in the preparation of the catalyst, an additional organic aluminum component (E) comprising at least one trialkyl aluminum compound of formula (4):

$$(R^4)_3Al \qquad (4)$$

wherein $R^4$ represents an alkyl group having 1 to 10 carbon atoms, is further added to the cobalt component (A), the alumoxane component (BD) and the halide component (C).

13. The process as claimed in claim 12, wherein in the preparation of the catalyst, the alumoxane component (BD) and the halide component (C) are aged together with the additional organic aluminum component (E) at a temperature of −50° C. to 80° C. for 0.1 to 10 hours, and then the resultant aged product is mixed with the cobalt component (A).

14. The process as claimed in claim 10, wherein the alumoxane component (BD) is present in an amount of 10 to 5000 moles per mole of the cobalt component (A).

15. The process as claimed in claim 10, wherein an atomic ratio (X/Al) of total halogen atoms in the halide component (C) to the total aluminum atoms in the alumoxane component (BD) and the halide component (C) is in the range of from 0.02 to 1.33.

16. The process as claimed in claim 12, wherein an atomic ratio (X/Al) of total halogen atoms in the halide component (C) to the total aluminum atoms in the alumoxane component (BD), the halide component (C) and the additional organic aluminum component (E) is in the range of from 0.02 to 2.0.

17. The process as claimed in claim 1, wherein the polymerization of 1,3-butadiene is carried out in a polymerization medium comprising at least one member selected from the group consisting of saturated aliphatic hydrocarbons, cycloaliphatic hydrocarbons and ethylenically unsaturated aliphatic hydrocarbons.

18. The process as claimed in claim 17, wherein the polymerization medium comprises at least one member selected from the group consisting of n-hexane, n-butane, n-heptane, n-pentane, cyclopentane, cyclohexane, 1-butene, cis-2-butene, and trans-2-butene.

19. A process for producing polybutadiene having a content of cis-1,4-structure of 95% or more, comprising:

polymerizing 1,3-butadiene in the presence of a catalyst, wherein the catalyst is obtained from:
(A) a cobalt component comprising at least one cobalt compound selected from cobalt halides, cobalt salts of inorganic and organic acids, cobalt acetylacetonate compounds, cobalt-acetoacetic ester complexes, cobalt halide-pyridine complexes, cobalt halide-picoline complexes, and cobalt halide-alkyl alcohol complexes,
(B) an organic aluminum component comprising at least one trialkylaluminum compound of formula (1):

$$(R^1)_3Al \qquad (1)$$

wherein $R^1$ represents an alkyl group having 1 to 10 carbon atoms, which alkyl group may be substituted,
(C) a halide component comprising at least one member selected from the group consisting of (a) aluminum halide compounds of formula (2):

$$AlR^2_mX_{3-m} \qquad (2)$$

wherein $R^2$ represents a hydrocarbon group having 1 to 10 carbon atoms, which hydrocarbon group may be substituted, X represents a halogen atom, and m represents a positive number of 0 to 2, and (b) hydrocarbon halide compounds of formula (3):

$$R^3-X \qquad (3)$$

wherein X is as defined above and $R^3$ represents a hydrocarbon group having 1 to 40 carbon atoms, which hydrocarbon group may be substituted, and
(D) water in an amount of 0.77 to 1.45 moles per mole of the total aluminum in components (B) and (C).

* * * * *